United States Patent [19]
Suzuki et al.

[11] Patent Number: 5,825,011
[45] Date of Patent: *Oct. 20, 1998

[54] HANDLE LIKE READING UNIT FOR USE IN CODE READING APPARATUS AND HAVING PLURAL LIGHT REFLECTORS AND DIRECT LIGHT SHIELDING PLATE

[75] Inventors: Masashi Suzuki, Mishima; Takashi Itoh, Fuji, both of Japan

[73] Assignee: Kabushiki Kaisha TEC, Shizuoka, Japan

[*] Notice: This patent issued on a continued prosecution application filed under 37 CFR 1.53(d), and is subject to the twenty year patent term provisions of 35 U.S.C. 154(a)(2).

[21] Appl. No.: 575,895

[22] Filed: Dec. 20, 1995

[30] Foreign Application Priority Data

Dec. 26, 1994 [JP] Japan .................................. 6-321898
Jan. 9, 1995 [JP] Japan .................................. 7-000981
May 15, 1995 [JP] Japan .................................. 7-115859

[51] Int. Cl.⁶ ................................................. G06K 7/10
[52] U.S. Cl. .......................... 235/472; 235/462; 235/455; 235/456; 235/483
[58] Field of Search .................... 235/472, 462, 235/454, 456, 483, 455

[56] References Cited

U.S. PATENT DOCUMENTS

| | | | |
|---|---|---|---|
| 4,488,678 | 12/1984 | Hara et al. | 235/462 X |
| 4,642,470 | 2/1987 | Planke | 235/462 X |
| 4,743,773 | 5/1988 | Katana et al. | 235/472 X |
| 4,818,847 | 4/1989 | Hara et al. | 235/462 X |
| 4,818,856 | 4/1989 | Matsushima et al. | 235/472 |
| 4,960,984 | 10/1990 | Goldenfield et al. | 235/462 |
| 5,408,084 | 4/1995 | Brandorff et al. | 235/472 X |
| 5,449,892 | 9/1995 | Yamada | 235/472 X |
| 5,567,934 | 10/1996 | Zheng et al. | 235/472 X |
| 5,585,615 | 12/1996 | Iwanami et al. | 235/472 |
| 5,602,379 | 2/1997 | Uchimura et al. | 235/472 |

FOREIGN PATENT DOCUMENTS 6-139397  5/1994  Japan .
6-139398  5/1994  Japan .

*Primary Examiner*—Donald T. Hajec
*Assistant Examiner*—Michael G. Lee
*Attorney, Agent, or Firm*—Frishauf, Holtz, Goodman, Langer & Chick

[57] ABSTRACT

The apparatus for reading a symbol of a 2-dimensional code has a diffusion plate and a diffuse reflection surface between a light source unit and an opening to prevent light emitted from the light source unit from directly reaching the opening. Illumination light from the light source unit reaches the diffuse reflection surface while the central axis of the light is shifted from the optical path to the diffusion plate. With this arrangement, nonuniformity of illumination light irradiated on a a symbol on object can be prevented, and a halation of light can be prevented. The symbol of the 2-dimensional code can therefore be accurately read.

9 Claims, 6 Drawing Sheets

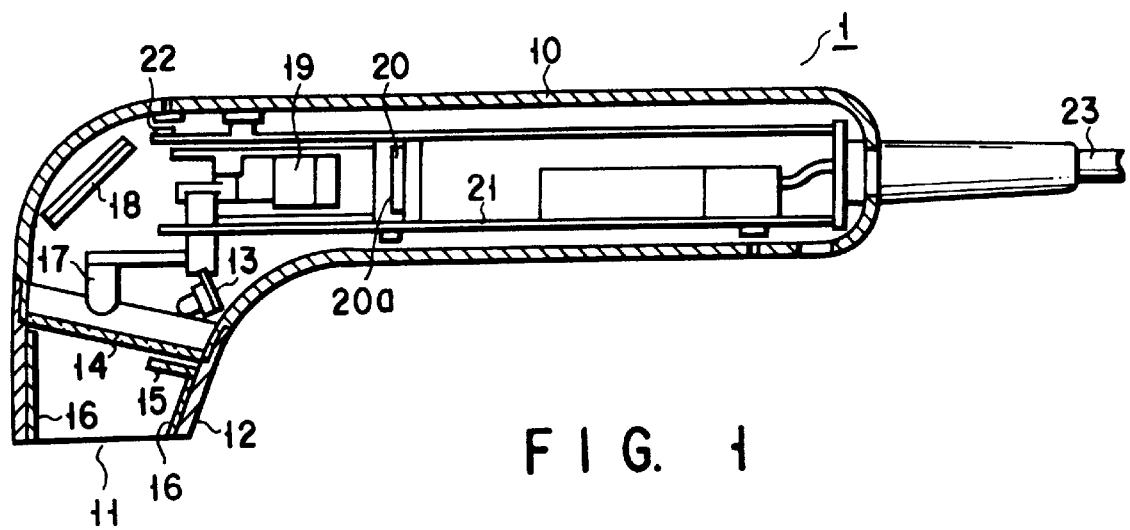
FIG. 1
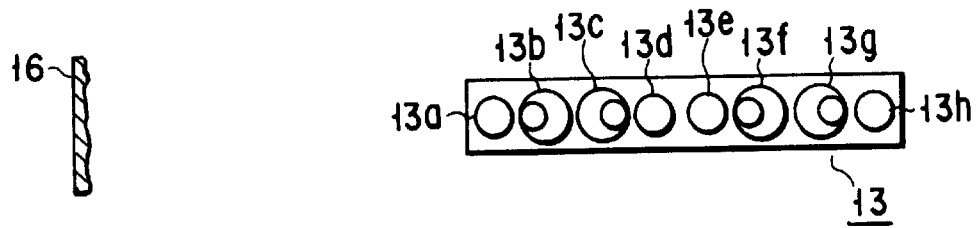
FIG. 1A
FIG. 2
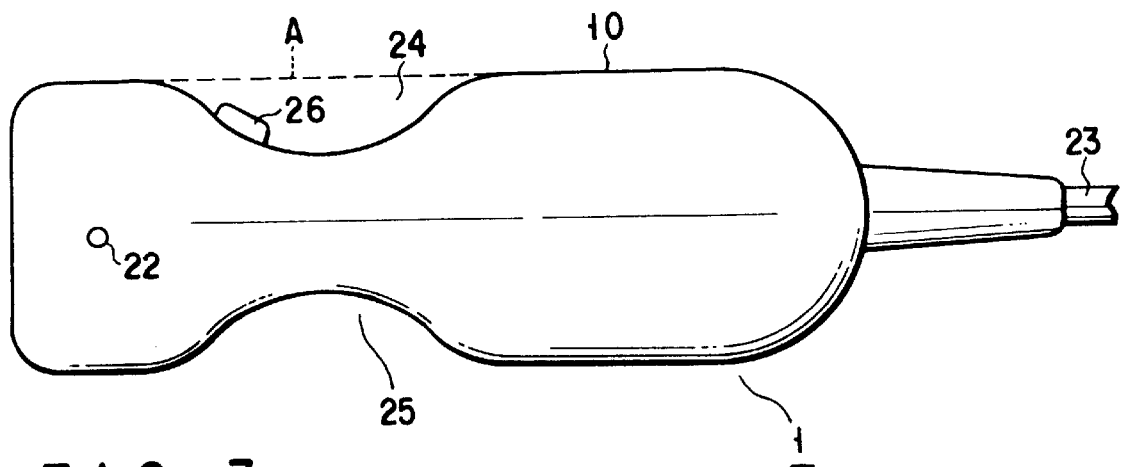
FIG. 3

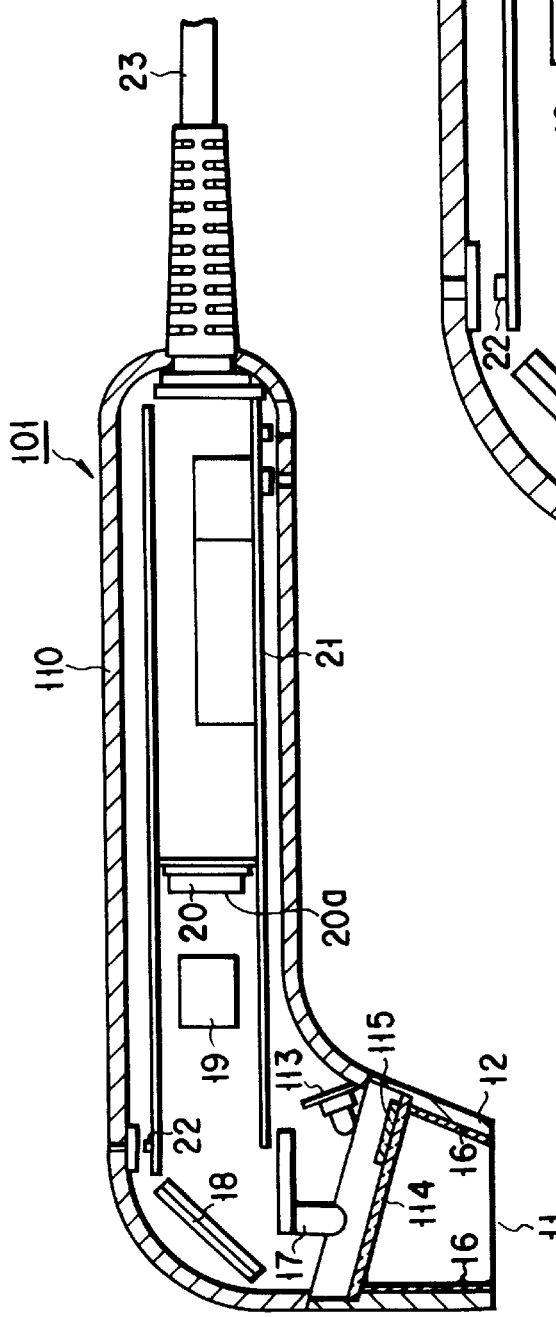
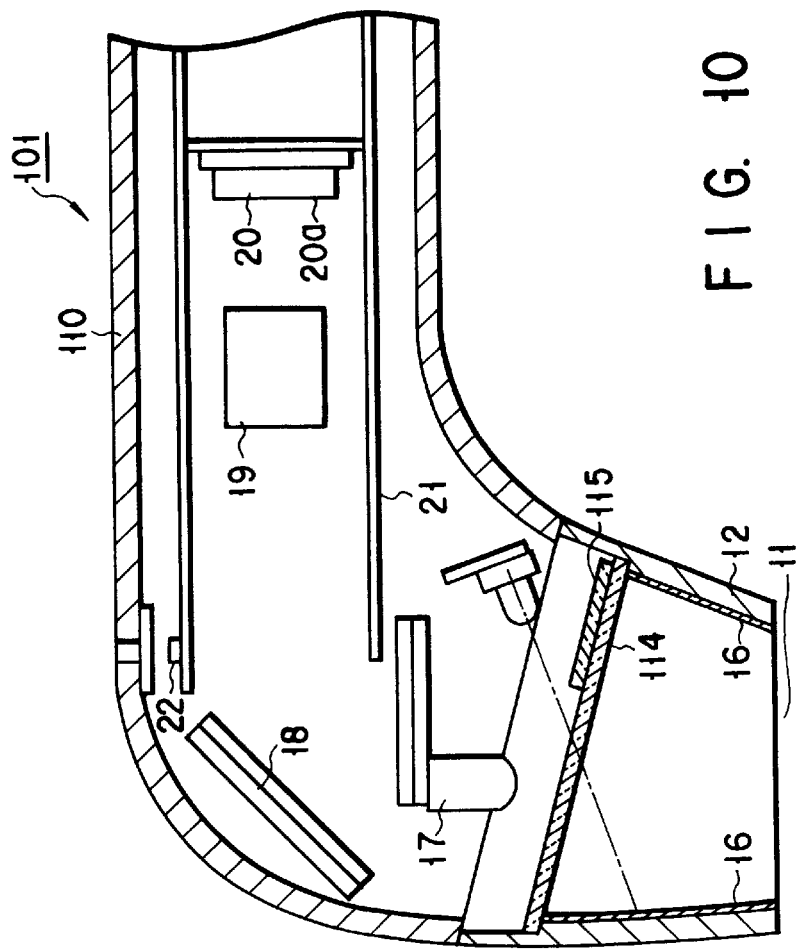
FIG. 9
FIG. 10

HANDLE LIKE READING UNIT FOR USE IN CODE READING APPARATUS AND HAVING PLURAL LIGHT REFLECTORS AND DIRECT LIGHT SHIELDING PLATE

BACKGROUND OF THE INVENTION

1. Field of the Invention

This invention relates to a handle like reading unit for use in a code reading apparatus to read a symbol of a 2-dimensional code.

2. Description of the Related Art

As a reading apparatus for reading a symbol of a 2-dimensional code, a handle like reading unit including a light source, a photo detector, and a signal processor which are integrally formed (in a handle like form) has been proposed. The light source irradiates light onto a symbol of a 2-dimensional code on an object. The photo detector converts light reflected by the object (the symbol of the 2-dimensional code) into an electrical signal. The signal processor recognizes the symbol of the 2-dimensional code on the basis of the electrical signal output from the photo detector.

The handle like reading unit has a housing member which houses the light source, the photo detector, and the signal processor.

An opening for guiding light emitted from the light source to the object is formed in the housing member at a predetermined position.

The light irradiated from the light source onto the object via the opening is reflected by the object and returned to the housing member via the opening.

The reflected light returned from the object to the housing member is reflected by a reflector mounted at a predetermined position on the housing member toward the photo detector.

The reflected light guided to the photo detector is converted into an electrical signal corresponding to the intensity of the light and output to the signal processor.

The electrical signal input to the signal processor is processed according to a predetermined rule to be recognized as the symbol of the 2-dimensional code. The signal is then output to a host system or computer.

A plurality of light-emitting diodes called LEDs are generally used for the light source. Light emitted from each of the LEDs passes through the opening to be directly guided to the object.

It is, however, known that light beams irradiated on the object become nonuniform in intensity because of, e.g., the differences in output between each of the LEDs, the differences in fixed state between each of the LEDs, the differences between the directivities which are given to light beams emitted from each of the LEDs by lenses integrally formed on the LEDs, the differences between the distances from each of the LEDs to the object, and/or the differences between the angles at which light beams from each of the LEDs are irradiated onto the object.

In many cases, the intensity of light reaching a portion near the center of the symbol of the 2-dimensional code on the object is higher than that of light reaching the remaining portions. For this reason, the intensity of light reflected by the central portion of the symbol of the 2-dimensional code becomes higher than that of light reflected by the remaining portions, so that erroneous recognition (read error) occurs when the symbol is recognized by the signal processor. Note that the nonuniform intensity of light increases the standby time required to stabilize the gain of the photo detector.

When the object to which the symbol of the 2-dimensional code is added on a medium which has a high reflectance, and/or reflected light from the object is incident on the photo detector at a specific angle (i.e., light is irradiated on the object at a specific angle), the intensity of light reflected by a low-reflectance area of the symbol (so-called black portion) may become higher than the intensity of light reflected by a portion on which no symbol is present (so-called white portion). In this case, the symbol which should be recognized as a black portion is recognized as a white portion, or a specific portion of the symbol may not be recognized. Note that this type of phenomenon is generally called halation.

If the object is cylindrical, the operator is required to take a difficult position to direct light from the light source of the handle like reading unit to the object perpendicularly. In addition, the symbol may be erroneously recognized.

SUMMARY OF THE INVENTION

It is an object of the present invention to provide a handle like reading unit for use in a code reading apparatus, which can accurately read a symbol of a 2-dimensional code.

It is another object of the present invention to provide a handle like reading unit for use in a code reading apparatus, which can irradiate illumination light with uniform intensity onto an object.

It is still another object of the present invention to provide a handle like reading unit for use in a code reading apparatus, which can reduce read errors given by a shape of an object.

The present invention is made on the basis of the above problems.

According to the present invention, there is provided an apparatus for reading a symbol of a 2-dimensional code comprising:

light source means, for illuminating light;

an opening portion, for guiding the illumination light to the symbol of the 2-dimensional code on an object; and diffusion means for diffusing a light beam emitted from the light source means and a light beam whose optical path is changed by the prevention means, when both the light beams pass through the opening portion, thereby obtaining a uniform intensity distribution.

According to the present invention, there is provided an apparatus for reading a symbol of a 2-dimensional code comprising:

light source means, for illuminating light;

an opening portion, for guiding the illumination light to the symbol of the 2-dimensional code on an object;

prevention means for preventing light emitted from the light source means from directly reaching the opening portion; and diffusion means for diffusing a light beam emitted from the light source means, when the light beam passes through the opening portion, thereby obtaining a uniform intensity distribution.

In addition, according to the present invention, there is provided an apparatus having a read opening in a portable apparatus body to read a code added to an object by placing the read opening on the object, irradiating light onto the code, and receiving light reflected by the code, comprising:

a plurality of notched portions formed on a first line and a second line perpendicular to the first line in end portions of the read opening which are brought into contact with the object to which the code is added.

According to the present invention, there is provided a 2-dimensional code reader for reading a 2-dimensional code added to an object by placing a read opening to oppose the 2-dimensional code, irradiating light on the 2-dimensional code, and receiving light reflected by the code, comprising:

a light source with high directivity; and a diffuse reflection member for diffusely reflecting light from the light source toward the 2-dimensional code positioned at the read opening.

Furthermore, according to the present invention, there is provided a 2-dimensional code reader for reading a 2-dimensional code added to an object by placing a read opening to oppose the 2-dimensional code, irradiating light on the 2-dimensional code, and receiving light reflected by the code, comprising:

a light source with high directivity;

a second light source with low directivity, which is used in combination with the first light source with high directivity; and a diffuse reflection member for diffusely reflecting light from the first light source toward the 2-dimensional code positioned at the read opening.

Moreover, according to the present invention, there is provided an apparatus for reading a symbol of a 2-dimensional code comprising:

a light source for irradiating illumination light;

a diffusion member placed on an optical path defined between the light source and an object and in an optical path extending straight to the symbol, the diffusion member diffusing the illumination light; and a diffuse reflection member for diffusely reflecting the illumination light emitted from the light source and diffused by the diffusion member toward the symbol.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a schematic sectional view showing a handle like reading unit (code reader) for use in a code reading apparatus;

FIG. 1A is a cross-sectional view of a portion of the diffusion plate;

FIG. 2 is a partial enlarged view showing the light source unit of the code reader in FIG. 1, viewed from the front surface side;

FIG. 3 is a schematic plan view showing the appearance characteristics of the code reader unit in FIGS. 1 and 2;

FIG. 9 is a schematic sectional view showing a code reader unit of a form different from that shown in FIGS. 1 to 8;

FIG. 10 is a partial enlarged view showing a peripheral portion of the light source unit of the code reader in FIG. 9;

DETAILED DESCRIPTION OF THE PREFERRED EMBODIMENTS

Figure 4:
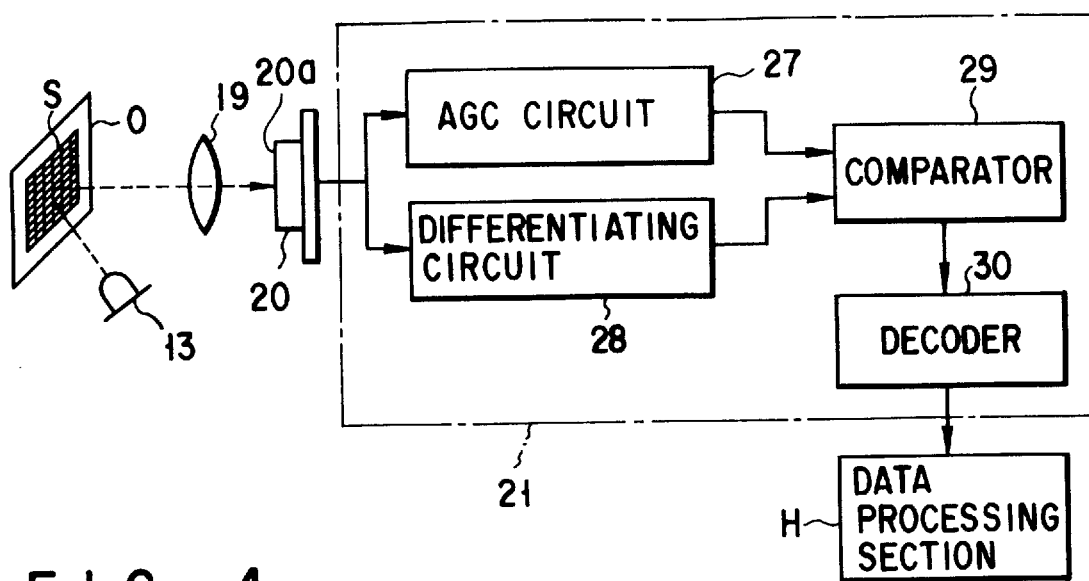
FIG. 4 is a block diagram showing a signal processor incorporated in the code reader unit in FIGS. 1 to 3.

Embodiments of the present invention will be described below with reference to the accompanying drawings.

FIG. 1 is a schematic sectional view showing a handle like reading unit for use in a code reading apparatus to which the present invention is applied.

A handle like reading unit (to be referred to as a code reader hereinafter) 1 has a housing member 10 having a predetermined shape which is easy for the operator to grip. The housing member 10 has an opening 11 for guiding light emitted from a light source (to be described below) to an object to which a symbol of a 2-dimensional code (not shown) is added. The opening 11 is formed as part of a hood 12 and can be detachable with respect to the housing member 10. The hood 12 (opening 11) is detached from the housing member 10 only when inspection and/or repair are/is performed.

A light source unit 13, a colorless (non-colored or non-dyed) transparent cover 14, and a shielding plate 15 are arranged at predetermined positions in the housing member 10. Each of the light source unit 13, the cover 14 and the shielding plate are positioned inside of the hood 12 of the housing member 10. The light source unit 13 emits light toward the object (to be referred to as the symbol on object hereinafter) to which the symbol of the 2-dimensional code is added. The cover 14 protects the light source unit 13. The shielding plate 15 prevents light emitted from the light source unit 13 from being directly irradiated on the object.

The light source unit 13 is an LED set constituted by a plurality of light-emitting diodes called LEDs which are arranged along a predetermined direction. The direction in which the LEDs of the LED set are arranged is set to be perpendicular to the cross-sectional direction in FIG. 1.

The cover 14 is made of, e.g., a colorless plastic material or non-dyed glass, and designed to prevent water and/or dust from entering the housing member 10.

The shielding plate 15 is used to smooth the intensity distribution of light directed from the light source unit 13 toward the symbol on the object. The shielding plate 15 is made of, e.g., a non-transparent member such as a metal or a dyed plastic material. A surface of the shielding plate 15 which opposes the light source unit 13 is preferably coated with a white material or metal powder to improve the utilization efficiency of light emitted from the light source unit 13. The white member or metal powder may be provided by bonding a sheet or paper coated with a white member or metal powder to the shielding plate 15.

A diffuse reflection surface 16 for diffusing and directing light from the light source unit 13 toward the opening 11 is formed on the inside of the hood 12 attached onto the housing member 10. The diffuse reflection surface 16 is provided by coating the inside of the hood 12 with a white material or metal powder and/or bonding a sheet or paper coated with a white material or metal powder to the inside of the hood 12.

Preferably, the diffuse reflection surface includes an uneven surface 16a for scattering incident light, as shown in FIG. 1A.

Two sub lights 17 serving as area guide lamps are disposed at predetermined positions in the housing member 10.

The two sub lights 17 are symmetrically disposed at a position a predetermined distance away from a symmetrical line (not shown) of the light source unit 13 (code reader 1). The sub lights 17 provide spot light for displaying the center of a read area when the housing member 10 is brought near the object. Note that the sub lights 17 are turned off when the symbol is read. The power consumption of the sub lights 17 is therefore small.

A reflector (mirror) 18 is disposed at a predetermined position in the housing member 10 to guide light emitted from the light source unit 13 and reflected by the symbol on the object to a predetermined position in the housing member 10. The reflector 18 guides light reflected from the symbol on the object, which is returned to the opening 11, to the detecting surface of a photo detector (to be described later).

In the direction in which the reflected light whose direction is changed through the reflector 18 is guided, a lens unit 19 and a photo detector 20 are arranged. The lens unit 19 forms the reflected light into an image at a predetermined position of the photo detector 20. The photo detector 20 converts the reflected light having passed through the lens unit 19 into an electrical signal.

The photo detector 20 has a detecting surface 20a which is 2-dimensionally developed, and serves to output a signal corresponding to a low-reflectance area of the symbol (called a black portion) and a portion without any symbol (called a white portion) which are included in the symbol of the 2-dimensional code. The photo detector 20 is preferably constituted by a charge coupled device called a CCD.

A signal processor 21 is also disposed at a predetermined position in the housing member 10. The signal processor 21 recognizes the symbol of the 2-dimensional code on the basis of the electrical output from the photo detector 20. The signal processor 21 includes devices (not shown) such as an LED driver, a CCD driver, a binary circuit, a decoder, a discrimination circuit, and a controller. The signal processor 21 exchanges signals with a host system (not shown) and manages the ON/OFF control operations of the light source unit 13 and the sub lights 17, decoding and discriminating of an output signal from the photo detector 20, and the like. A trigger switch (to be described later with reference to FIG. 3) is connected to the signal processor 21. The signal processor 21 receives an instruction to read the symbol on the object from the operator. When an instruction for a read operation of the code reader 1 is received through the trigger switch, an indicator lamp 22, which is disposed at a predetermined position on the outer side of the housing member 10 and indicates that the code reader 1 is in a busy state, notifies the operator that the code reader 1 is being operated.

The output signal corresponding to the symbol on the object, which is discriminated by the signal processor 21, is supplied to a host system to be described later in FIG. 4 via a connection cable 23.

An arrangement for making illumination light emitted from the light source unit 13 have a uniform intensity will be described in detail next.

Each of the LEDs of the light source unit 13 is fixed to the housing member 10 such that the axis of light emitted from each LED is directed to the diffuse reflection surface 16. In other words, the emitting direction of each LED is set to be different from the direction of the opening 11. Note that part of light emitted from each of the LEDs of the light source unit 13 propagates toward the shielding plate 15, but the shielding plate 15 prevents the light from directly reaching the object. The light blocked by the shielding plate 15 is guided to the opening 11 by the diffuse reflection surface 16.

As shown in FIG. 2, the light source unit 13 has first to eighth LEDs 13a to 13h arranged in a line along the cross-sectional direction in FIG. 1. The LEDs 13a to 13h include LEDs capable of emitting light having the first intensity of light and LEDs capable of emitting light having the second intensity of light which is higher than the first intensity of light. These LEDs are arranged in a predetermined order. In other words, the LEDs 13a to 13h are constituted by two types of LEDs having different luminances.

The luminances of the LEDs are set such that the first and eighth LEDs 13a and 13h arranged on two ends of the unit 13 emit light having the first intensity of light, the fourth and fifth LEDs 13d and 13e located in the middle of the unit 13 and on both sides of a symmetrical line (not shown) emit light having the first intensity of light, and the remaining LEDs, i.e., the second, third, sixth, and seventh LEDs 13b, 13c, 13f, and 13g emit light having the second intensity of light. In this embodiment, as the LEDs capable of emitting light having the second intensity of light, LEDs capable of emitting light with high directivity are used. That is, as the second, third, sixth, and seventh LEDs 13b, 13c, 13f, and 13g, LEDs, each incorporating a lens having a small divergence angle as a diffusion lens to be formed integrally with the LED, are selected.

The second, third, sixth, and seventh LEDs 13b, 13c, 13f, and 13g, each having high directivity and high luminance, are arranged such that the emitting direction defines a predetermined angle with respect to a parting line (not shown). In this case, the LEDs are arranged such that light beams emitted from adjacent LEDs do not cross each other. For example, the LEDs are fixed such that the angles defined by the second, third, sixth, and seventh LEDs 13b, 13c, 13f, and 13g become obtuse angles (larger than 90°). More specifically, the second LED 13b is mounted to tilt toward an end portion (the first LED 13a side) of the unit 13, and the third LED 13c is mounted to tilt toward the middle (the fourth LED 13d side) of the unit 13. Similarly, the sixth LED 13f is mounted to tilt toward the center (the fifth LED 13e side) of the unit 13, and the seventh LED 13g is mounted to tilt toward the other end portion (the eight LED 13h side) of the unit 13.

As described above, the code reader shown in FIGS. 1 and 2 uses the second, third, sixth, and seventh LEDs 13b, 13c, 13f, and 13g, each having high directivity and high luminance, and the first, fourth, fifth, and eighth LEDs 13a, 13d, 13e, and 13h, each having low directivity. The shielding plate 15 is used to prevent light having high directivity and high luminance from directly reaching the object. In addition, the diffuse reflection surface 16 is used to diffuse light propagating toward the opening 11. With this arrangement, light having uniform intensity can be irradiated on the the symbol on object. The symbol of the 2-dimensional code can therefore be accurately read.

As shown in FIG. 3, the code reader 1 has recesses 24 and 25 at a portion to be gripped by the hand of the operator, when viewed from the planar direction.

A trigger switch 26 for instructing a read start of the symbol on object by the code reader 1 is arranged in one of the recesses 24 and 25. The trigger switch 26 is located inside a broken line A indicating the contour of the housing member 10 without the recesses 24 and 25. With this arrangement, an accidental start of reading of the symbol on the object can be prevented even if the housing member 10, i.e., the code reader 1, is dropped or bumps against something.

A method of reading a symbol by using the code reader in FIGS. 1 to 3 will be described next.

As shown in FIG. 4, first of all, illumination light from the light source unit 13 of the code reader 1 is irradiated on a symbol on an object S touching or opposing the opening 11 (not shown in FIG. 4) at a predetermined distance. In this case, the intensity of light irradiated on the symbol S is almost uniform throughout the entire exit region of the opening 11. That is, the light guided to the opening 11 includes light components reflected diffusely by the diffuse reflection surface 16 and light components which are not reflected diffusely by the diffuse reflection surface 16 and have low luminance. For this reason, the intensity of light does not increase locally.

The light reflected by the symbol of the 2-dimensional code returns to the housing member 10 through the opening 11.

The reflected light from the object (symbol), which returns to the housing member 10, is reflected by the reflector 18 toward the photo detector 20. The lens 19 provides predetermined convergence for the light reflected by the reflector 18. The light is then formed into an image on the detecting surface 20a of the photo detector 20.

The reflected light from the symbol, which is formed into an image on the photo detector 20, is converted into an electrical signal having amplitudes corresponding to the intensity of light reflected by the low-reflectance area of the symbol and the intensity of light reflected by the portion without any symbol.

The electrical signal output from the photo detector 20 is input to an automatic gain control (AGC) circuit 27 and a differentiating circuit 28.

As described later with reference to FIGS. 7 and 8, the AGC circuit 27 sets the level of the gain for an input signal received in accordance with the intensity of reflected light which returns from the symbol on the object through the opening 11.

The differentiating circuit 28 differentiates the output signal from the photo detector 20 to extract an inflection point used to discriminate the light reflected by the low-reflectance area of the symbol and the light reflected by the portion without any symbol, which are included in the output signal.

The output signals from the AGC circuit 27 and differentiating circuit 28 are compared with each other and converted into binary data by a comparator 29 while the signal level of the signal output from the differentiating circuit 28 is used as a reference level.

The binary data output from the comparator 29 is converted into coded data by a decoder 30.

The coded data output from the decoder 30 is supplied to a data processing section (host system) H via the connection cable 23.

Setting of a read timing for the symbol on the object, which is performed by the data processing section (host system) H, will be described next. A read timing is set every time an interruption is generated by interruption generating processing.

Figure 5:
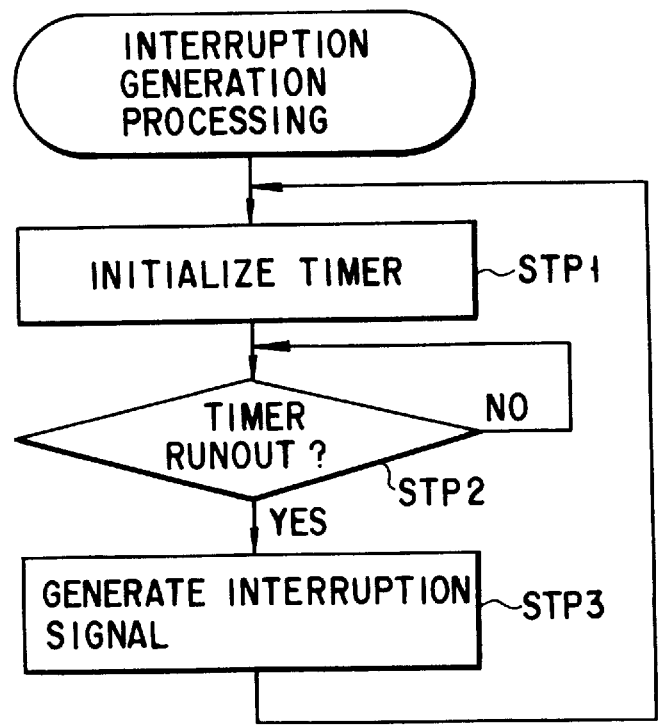
FIG. 5 is a flow chart for explaining a method of generating a trigger for defining the read interval of the code reader unit in FIGS. 1 to 4.

FIG. 5 shows the flow of interruption generating processing performed by the host system H. That is, interruption processing (to be described later) can be performed at predetermined intervals in accordance with the routine shown in FIG. 5.

First of all, a timer (not shown) is initialized, and counting of internal clocks is started (step STP1).

Internal clocks are kept counted until the cumulative time obtained by counting the internal clocks coincides with a preset time (step STP2). When the cumulative time coincides with the preset time (YES in step STP2), an interruption signal is generated (step STP3).

Subsequently, steps STP1 to STP3 are repeated.

Figure 6:
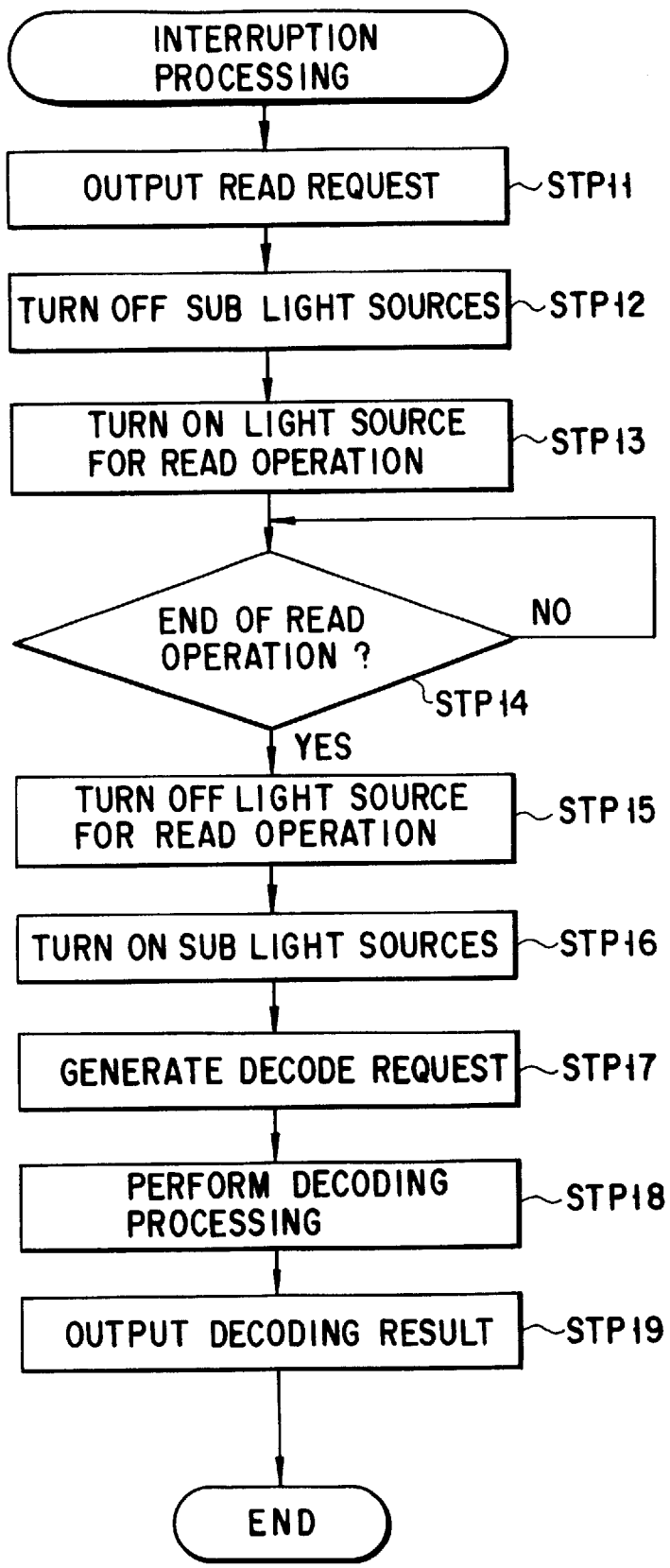
FIG. 6 is a flow chart for explaining the ON/OFF control operations of the main and sub LED sets of the code reader unit in FIGS. 1 to 4.

FIG. 6 shows the process of reading the symbol on object, which operation is designated by the host system H, upon generation of the interruption signal in FIG. 5.

First of all, when the trigger switch 26 is turned on, the code reader 1 outputs a read request to the host system H to instruct the start of reading of the symbol on the object (step STP11).

When the read request is output in step STP11, the sub lights 17 which have been in the ON state are turned off (step STP12).

All the LEDs of the light source unit 13 are then turned on (step STP13).

The symbol on the object is imaged by the photo detector 20 (step STP14).

When the symbol on the object is imaged in step STP14 (YES in step STP14), all the LEDs of the light source unit 13 are turned off (step STPl5).

The sub lights 17 are turned on again (step STP16).

The symbol on the object imaged by the photo detector 20 is converted into binary data by the comparator 29, and a request to decode the data is output to the decoder 30 (step STP17).

When the request to decode the data is output in step STP17, the symbol on the object imaged by the photo detector 20 is converted into coded data through the decoder 30 (step STP18).

The output corresponding to the symbol on the object converted into the coded data in step STP18 is output to the host system H via the connection cable 23.

Figure 7:
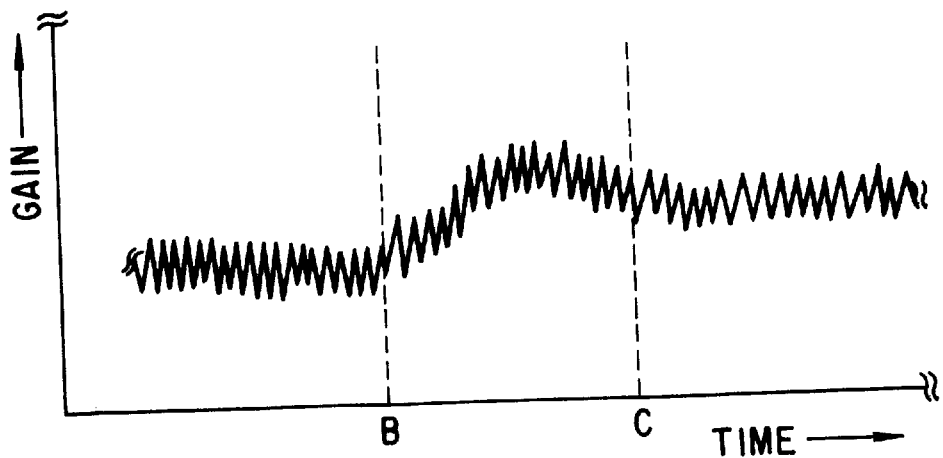
FIG. 7 is a graph for explaining the time required to stabilize gain control which is provided by the ON control operation of the sub LED set in FIG. 6.
Figure 8:
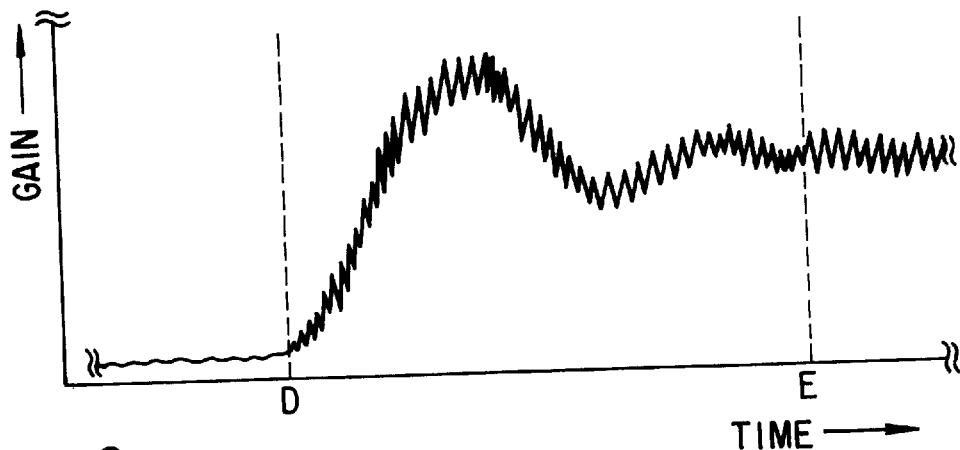
FIG. 8 is a graph showing the time required to stabilize gain control without the ON control operation of the sub LED set in FIG. 6.

FIGS. 7 and 8 show the waveforms of output signals from the AGC circuit 27.

A point B in FIG. 7 indicates that all the LEDs of the light source unit 13 are turned on. According to the control shown in FIG. 7, since the sub lights 17 have been turned on before the point B, the gain of the AGC circuit 27 is held at a certain level other than zero.

More specifically, even if the sub lights 17 are turned off, since the intensity of light does not instantaneously fall to zero (because of the characteristics of LED elements), the output level of the photo detector 20 does not drop either. For this reason, the level of a signal output from the photo detector 20 to the AGC circuit 27 is kept at a level near the set value of the gain for the input signal.

When all the LEDs of the light source unit 13 are turned on at the point B, since light from the light source unit 13 is irradiated on the photo detector 20 while the output level of the photo detector 20 which corresponds to the intensity of light from the sub lights 17 is kept, the illuminance on the detecting surface 20a of the photo detector 20 increases slowly. With this operation, the output level of the output signal from the photo detector 20 increases slowly. The tracking characteristics of gain control of the AGC circuit 27 can therefore be improved. As a result, the control level of the gain of the AGC circuit 27 stabilizes at a point C.

In contrast, in the control shown in FIG. 8, the sub lights 17 are not turned on before all the LEDs of the light source unit 13 are turned on.

A point D indicates that all the LEDs of the light source unit 13 are turned on. As is apparent from FIG. 8, when the sub lights 17 are not turned on (before the point D), the output level of the AGC circuit 27 is almost zero. When, therefore, all the LEDs of the light source unit 13 are turned on, the illuminance on the detecting surface 20a of the photo detector 20 increases sharply. In this case, the level of a signal output from the photo detector 20 also increases sharply. For this reason, the tracking characteristics of the gain control of the AGC circuit 27 deteriorate, and the time required to stabilize the output signal from the AGC circuit 27 is prolonged.

As described above, when the sub lights 17 are preliminarily turned on before all the LEDs of the light source unit 13 are turned on, a reduction in power consumption can be realized, and the time required to stabilize the gain of the AGC circuit 27 can be shortened.

FIGS. 9 and 10 schematically show a unit different from the code reader in FIGS. 1 to 8. The same reference numerals in FIGS. 9 and 10 denote the same parts as in FIGS. 1 to 8, and a detailed description thereof will be omitted.

A handle like reading unit (to be referred to as a code reader hereinafter) 101 has a housing member 110.

A light source unit 113, a transparent cover 114, and a diffusion plate 115 are arranged at predetermined positions in the housing member 110. The light source unit 113 emits light toward the object (to be referred to as the symbol on object hereinafter) to which the symbol of the 2-dimensional code is added. The cover 114 protects the light source unit 113. The diffusion plate 115 prevents light emitted from the light source unit 113 from being directly irradiated on the object.

The light source unit 113 is an LED set constituted by a plurality of light-emitting diodes which are arranged along a predetermined direction. The direction in which the LEDs of the LED set are arranged is set to be perpendicular to the cross-sectional direction in FIG. 9.

The cover 114 is made of, e.g., a non-colored and transparent plastic or glass material, and designed to prevent water and/or dust from entering the housing member 110.

The diffusion plate 115 is used to smooth the intensity distribution of light directed from the light source unit 113 toward the symbol on the object.

The diffusion plate 115 is provided by frosting at least an area of a non-dyeing transparent member such as a glass or plastic material through which light passes, or forming an uneven surface including fine projections and recesses in an area of a transparent member through which light passes.

The frosted or uneven surface can also be provided by fixing a frosted sheet or tape (not shown) or a sheet or tape on which projections and recesses are formed in advance to the body of the diffusion plate 115. If such a sheet or tape is arranged at a specific position on the cover 114, the diffusion plate 115 may be omitted. Instead of using this sheet or tape, at least an area of the cover 114 through which light passes may be frosted, or an uneven surface including fine projections and recesses may be formed in an area of the cover 114 through which light passes.

An arrangement for making illumination light emitted from the light source unit 113 have a uniform intensity will be described in detail next.

As shown in FIG. 10, each of the LEDs of the light source unit 113 is fixed to the housing member 110 such that the axis of light emitted from each LED is directed to the diffuse reflection surface 16. In other words, the emitting direction of each LED is set to be different from the direction of the opening 11.

Figure 11:
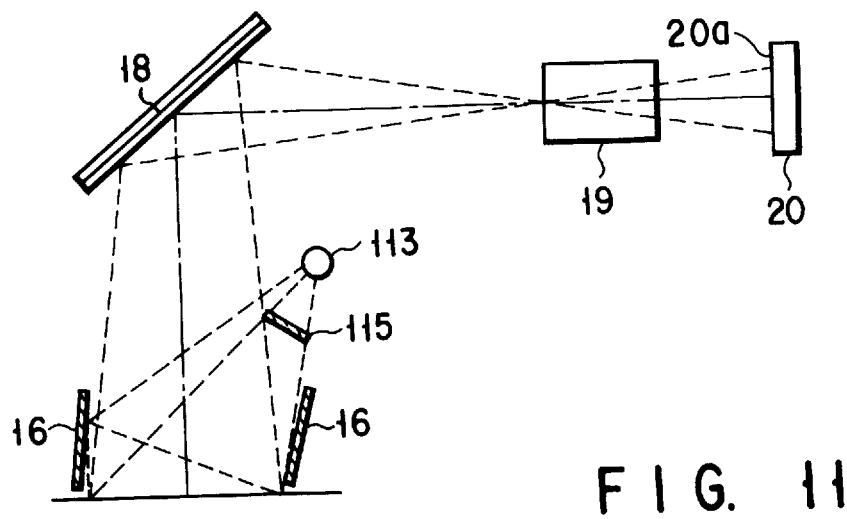
FIG. 11 is a schematic view showing how illumination light from the code reader in FIG. 9 diffuses and forms an image.

Referring to FIG. 11, the light source unit 113 and the diffusion plate 115 are positioned such that light from the light source unit 113 emerges from the housing member 110 through the opening 11 after passing through the diffusion plate 115 or being reflected by the diffuse reflection surface 16. The size of the diffusion plate 115 is set not to block light reflected by the object when it returns to the mirror 18. That is, the size and shape of the diffusion plate 115 are optimized to block the entire region of the optical path of light which is not reflected by the diffuse reflection surface 16 when the light from the light source unit 113 emerges from the housing member 110. With this arrangement, illumination light which is transmitted through and diffused by the diffusion plate 115 and illumination light which is reflected diffusely by the diffuse reflection surface 16 are superposed on each other to be irradiated on the symbol on object which opposes the code reader 101 through the opening 11. For this reason, illumination light from the light source unit 113 is not directly irradiated on the object.

As described above, light emitted from the light source unit 113 and propagating toward the opening 11 passes through the diffusion plate 115 and is reflected by the diffuse reflection surface 16, so that the illumination light from the light source unit 113 reaches the diffuse reflection surface 16 while the central axis of the light is shifted from the optical path to the diffusion plate 115. With this arrangement, nonuniformity of illumination light irradiated on the symbol on object can be prevented, and a halation of the light can be prevented. The symbol of the 2-dimensional code can therefore be accurately read.

Figure 12:
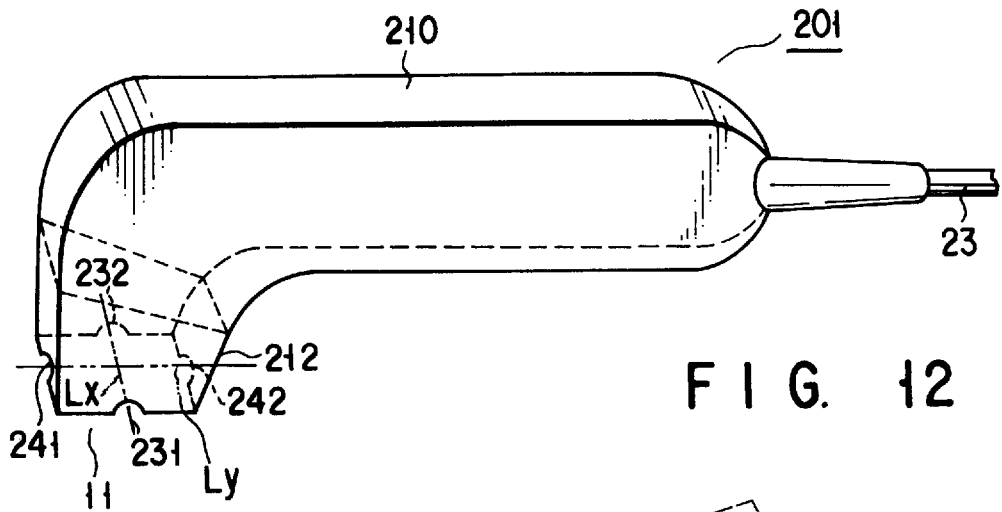
FIG. 12 is a schematic plan view showing the features of a shape which can be used for the housing member of the code reader shown in FIGS. 1 to 8 or FIGS. 9 to 11.

FIG. 12 shows the characteristics of a housing member which can be used for the code reader shown in FIGS. 1 to 8 and/or the code reader shown in FIGS. 9 to 11. The same reference numerals in FIG. 12 denote the same parts as in FIGS. 1 to 8 and/or FIGS. 9 to 11, and a detailed description thereof will be omitted.

As shown in FIG. 12, a code reader 201 has a housing member 210 including a hood 212 having a plurality of notches formed in its peripheral portion. The hood 212 has an opening 11 for guiding illumination light emitted from the light source unit 13 fixed at a predetermined position in the housing member 210 to the symbol on object.

Pairs of arcuated notches 231 and 232, and 241 and 242 are formed near the middle portions of the end portions of the hood 212 which define the opening 11 and which are the sides of the hood 212.

The radius of the arc of each of the notches 231, 232, 241, and 242 is set to be about ½ the curvature radius of an object whose curved surface has the minimum curvature. In other words, the width (the length of the chord of each arc) of each of the notches 231, 232, 241, and 242 is set to be smaller than the diameter of the curvature of the curved surface of the object. Each of notches 231 and 232 are arranged on a first line Lx, and notches 241 and 242 are arranged on a second line Ly perpendicular to the first line Lx. In addition, the depth of each notch is set to be larger than the distance from the center of the arc of the curvature of the curved surface of the object to the chord.

A method of reading a symbol on object which is added to a cylindrical object by using the code reader 201 incorporating the hood 212 having the notches 231, 232, 241, and 242 will be described below with reference to FIGS. 13 and 14.

Figure 13:
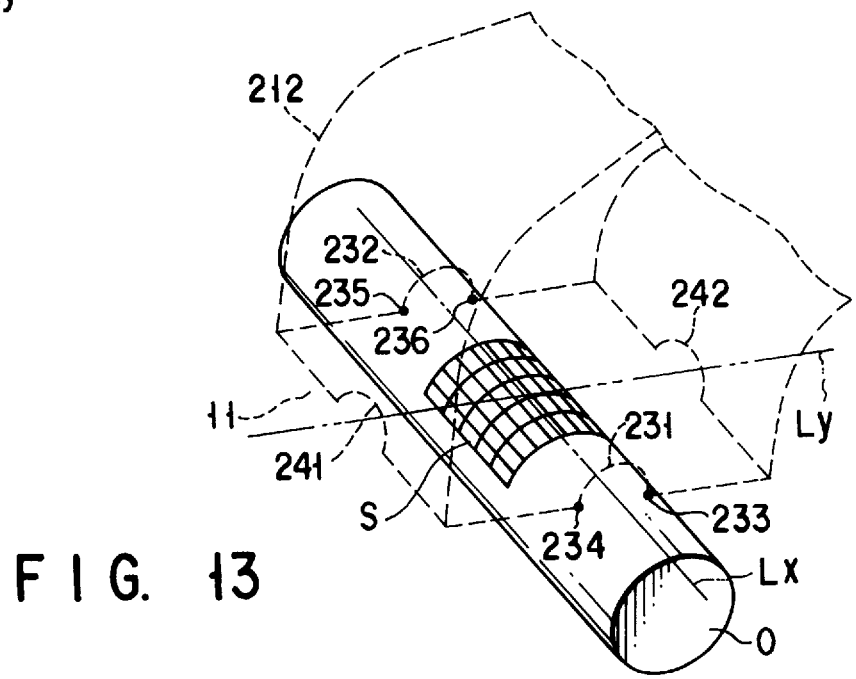
FIG. 13 is a schematic perspective view showing an advantage obtained when the housing member in FIG. 12 is used.

Referring to FIG. 13, assume that a symbol of a 2-dimensional code is prepared with its right and left portions (of a symbol on object S) being symmetrical about the axial direction of an object O. In this case, when the hood 212 (opening 11) of the code reader 201 is positioned to oppose the symbol on object S, edges 233, 234, 235, and 236 of the pair of notches 231 and 232 located on the first line Lx connecting the opposing end portions come in contact with the curved surface (side surface) of the object O at two pair of two points 233 and 234, and 235 and 236. In this case, when the middle positions of a read range in the lateral direction are defined by using the remaining pair of notches 241 and 242 (second line Ly), the center of the symbol on object S and the center of the opening 11 can be easily aligned with each other.

Since each of the edges 233, 234, 235, and 236 has a length corresponding to the thickness of the hood 212 and contacts with the object at two pair of two points, undesired rotation of the object O can be prevented. Even a symbol on a cylindrical object can be accurately read.

Figure 14:
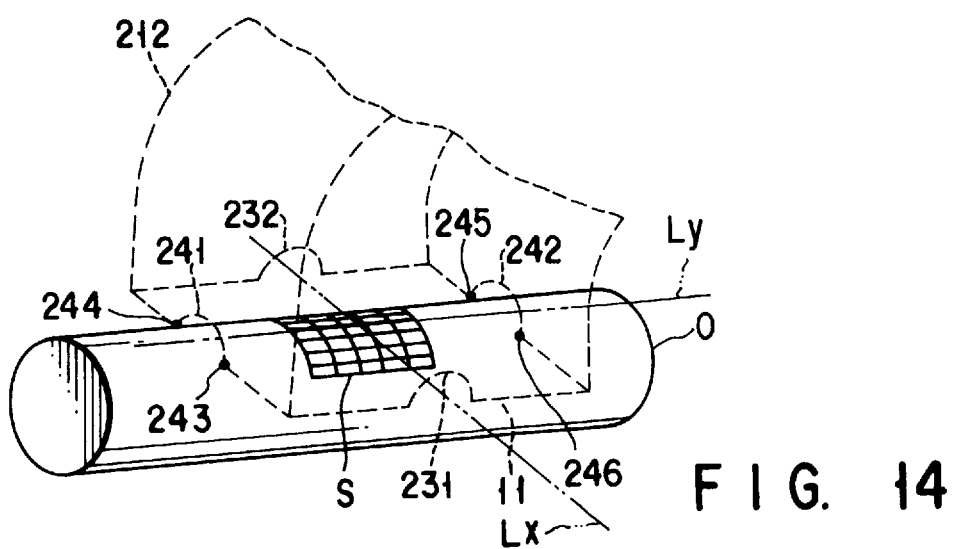
FIG. 14 is a schematic perspective view showing another advantage obtained when the housing member in FIG. 12 is used.

In contrast, as shown in FIG. 14, assume that a symbol of a 2-dimensional code is prepared with its top and bottom portions (of a symbol on object S) being symmetrical about the axial direction of an object O. In this case, when the hood 212 of the code reader 201 is positioned to oppose the symbol on object S, edges 243, 244, 245, and 246 of the pair of notches 241 and 242 located on the second line Ly connecting the opposing end portions come in contact with the curved surface (side surface) of the object O at two pair of two points 243 and 244, and 245 and 246. In this case, when the middle positions of a read range in the lateral direction are defined by using the remaining pair of notches 231 and 232 (second line Ly), the center of the symbol on object S and the center of the opening 11 can be easily aligned with each other.

Since each of the edges 243, 244, 245, and 246 has a length corresponding to the thickness of the hood 212 and contacts with the object at two pair of two point, undesired rotation of the object 0 can be prevented. Even a symbol on a cylindrical object can be accurately read.

If the width (the length of each arc) of each notch is set to be larger than the diameter of an object, i.e., the curvature radius of each notch of the hood 212 is larger than the diameter of the object, the object O may rotate about its axial center. For this reason, it must be noted that a read error tends to occur in reading a symbol of a 2-dimensional code. When the width (the length of each arc) of each notch is set to be equal to the diameter of an object, rotation of the object about its axial center can be prevented. However, since the object is offset toward the light source unit 13 relative to the position of the read surface defined by the opening 11 and the hood 212, the focal length shifts. For this reason, the width of each of the notches 231, 232, 241, and 242, i.e., the radius of each arc, is preferably set to be about ½ the curvature radius of the object. Note that the width of each of the notches 231, 232, 241, and 242 may be set to be about ⅓, ⅔, or ⅘ the curvature radius of each of various objects within the range in which the focal length is not affected.

As has been described above, undesired rotation of a cylindrical object about its axial center can be prevented by forming arcuated notches in the hood of the housing member such that each arcuated notch has a radius of curvature smaller than the diameter of the cylindrical object. In addition, even a symbol of a 2-dimensional code on the cylindrical object can be accurately read.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An apparatus for reading a symbol of a 2-dimensional code comprising:

a light source for providing an illumination light;

an opening portion for guiding the illumination light to the symbol of the 2-dimensional code on an object;

a diffusion device for reflecting the illumination light from said light source at least one time, thereby making an intensity of the illumination light uniform, said diffusion device being provided on at least two portions of an inner wall of said opening portion, and including an uneven surface for diffusing and scattering the illumination light; and a prevention device, having a diffusion plate member which is mounted together with a transparent member arranged at a predetermined position, said diffusion plate member being arranged in a direct line between said light source and said opening portion for preventing light emitted from said light source from directly reaching said opening portion and for thereby preventing the light emitted from said light source from directly shining on the symbol being read, and wherein said diffusion plate member is arranged in registration with only a portion of said transparent member and said opening portion.

2. An apparatus according to claim 1, wherein said opening portion includes a plurality of notches in end portions thereof which are brought into contact with the object.

3. An apparatus according to claim 2, wherein the plurality of notches are arranged on a first line and a second line perpendicular to the first line.

4. An apparatus according to claim 3, wherein the first and second lines are crossed on a center of a read range.

5. An apparatus having a read opening in a portable apparatus body to read a code added to an object by placing the read opening on the object, irradiating light onto the code, and receiving light reflected by the code, comprising:

a light source in the apparatus body for providing illumination light;

a prevention device, having a diffusion plate member which is mounted together with a transparent member arranged at a predetermined position, said diffusion plate member being arranged in a direct line between said light source and said read opening for preventing light emitted from said light source from directly reaching said read opening and for thereby preventing the light emitted from said light source from directly shining on the symbol being read, and wherein said diffusion plate member is arranged in registration with only a portion of said transparent member and said read opening; and a plurality of notched portions formed on a first line and a second line perpendicular to the first line in end portions of the read opening which are brought into contact with the object to which the code is added.

6. An apparatus according to claim 5, wherein the first and second lines are crossed on a center of a read range.

7. An apparatus according to claim 6, wherein each of the notched portions of the read opening are brought into contact with the object at two points.

8. A 2-dimensional code reader for reading a 2-dimensional code added to an object by placing a read opening to oppose the 2-dimensional code, irradiating light on the 2-dimensional code, and receiving light reflected by the code, comprising:

a light source with high directivity;

a light-shielding member and a transparent member arranged at a same position in a straight optical path from said light source with high directivity to said read opening, said light-shielding member comprising a diffusion plate member which is arranged in a direct line between said light source and said read opening for preventing light emitted from said light source from directly reaching said read opening and for thereby preventing the light emitted from said light source from directly shining on the symbol being read, and wherein said diffusion plate member is arranged in registration with only a portion of said transparent member and said read opening; and a diffuse reflection member for diffusely reflecting light from said light source toward the 2-dimensional code positioned at said read opening.

9. A 2-dimensional code reader for reading a 2-dimensional code added to an object by placing a read opening to oppose the 2-dimensional code, irradiating light on the 2-dimensional code, and receiving light reflected by the code, comprising:

a light source with high directivity;

a second light source with low directivity, which is used in combination with said first light source with high directivity;

a prevention device, having a diffusion plate member which is mounted together with a transparent member arranged at a predetermined position, said diffusion plate member being arranged in a direct line between said light source and said read opening for preventing light emitted from said light source from directly reaching said read opening and for thereby preventing the light emitted from said light source from directly shining on the symbol being read, and wherein said diffusion plate member is arranged in registration with only a portion of said transparent member and said read opening a diffuse reflection member for diffusely reflecting light from said first light source toward the 2-dimensional code positioned at said read opening.

* * * * *

UNITED STATES PATENT AND TRADEMARK OFFICE
CERTIFICATE OF CORRECTION

PATENT NO. : 5,825,011
DATED : October 20, 1998
INVENTOR(S) : Suzuki et al.

It is certified that error appears in the above-identified patent and that said Letters Patent is hereby corrected as shown below:

On the Title page, Item [57] ABSTRACT, line 9, change "a a" to --a--; and before "object", insert --an--.

Signed and Sealed this

Twenty-fourth Day of August, 1999

Attest:

Q. TODD DICKINSON

Attesting Officer

Acting Commissioner of Patents and Trademarks